US008032403B2

(12) United States Patent
Gremont et al.

(10) Patent No.: US 8,032,403 B2
(45) Date of Patent: Oct. 4, 2011

(54) METHOD AND SYSTEM FOR ASSIGNING STAFF AS A SERVICE IN A SERVICE NETWORK WITHIN A COMPONENT BUSINESS MODEL ARCHITECTURE

(75) Inventors: Lindsey Gremont, Austin, TX (US); Johnny Kwan, Randolph, MA (US); Wayne R. Porr, Little Ferry, NJ (US); Guy Jonathan James Rackham, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/347,822

(22) Filed: Dec. 31, 2008

(65) Prior Publication Data

US 2010/0169150 A1 Jul. 1, 2010

(51) Int. Cl.
*G06Q 10/00* (2006.01)
(52) U.S. Cl. .............. 705/7.14; 705/7.12; 705/7.17; 705/7.22; 705/7.23
(58) Field of Classification Search ......... 705/7.11–7.42
See application file for complete search history.

(56) References Cited

U.S. PATENT DOCUMENTS

| | | | |
|---|---|---|---|
| 5,111,391 A | 5/1992 | Fields et al. | |
| 5,164,897 A | 11/1992 | Clark et al. | |
| 5,911,143 A * | 6/1999 | Deinhart et al. | ....................... 1/1 |
| 6,049,776 A | 4/2000 | Donnelly et al. | |
| 6,275,812 B1 | 8/2001 | Haq et al. | |
| 6,567,784 B2 | 5/2003 | Bukow | |
| 7,191,139 B2 | 3/2007 | Roy et al. | |
| 7,219,066 B2 | 5/2007 | Parks et al. | |
| 2002/0026338 A1* | 2/2002 | Bukow | .............................. 705/7 |
| 2003/0177049 A1 | 9/2003 | Honda et al. | |
| 2005/0246215 A1* | 11/2005 | Rackham | ........................ 705/7 |
| 2006/0122875 A1* | 6/2006 | Kolbe | ............... 705/8 |
| 2007/0043603 A1* | 2/2007 | Andersen et al. | ................. 705/9 |
| 2007/0150327 A1* | 6/2007 | Dromgold | ......................... 705/8 |
| 2007/0174109 A1* | 7/2007 | Cohn et al. | ....................... 705/10 |
| 2007/0233742 A1 | 10/2007 | Pickford et al. | |
| 2008/0313596 A1* | 12/2008 | Kreamer et al. | .............. 717/101 |
| 2010/0138248 A1 | 6/2010 | Rackham | |
| 2010/0138249 A1 | 6/2010 | Rackham | |
| 2010/0138265 A1 | 6/2010 | Rackham | |

(Continued)

OTHER PUBLICATIONS

Forelle "IBM Catalogs Workers to Cut Costs; Efficiency Tool Aims to Find Right Employee for the Job at Optimum Cost Location" (Jul. 15, 2005) Asian Wall Street Journal, p. M.7.*

(Continued)

*Primary Examiner* — Scott L Jarrett
*Assistant Examiner* — Sujay Koneru
(74) *Attorney, Agent, or Firm* — Whitham, Curtis, Christofferson & Cook, P.C.; John R. Pivnichny

(57) ABSTRACT

A method and system using a component business model (CBM) architecture provides a staff assignment service to an enterprise. A staff assignment scenario is described in terms of business components in a CBM architecture of the enterprise, the applicable business components forming a staffing service network. For each business component in the staffing service network, functionalities supporting the scenario are identified, and collaborative links among the business components are established, sufficient to enable the service functionalities within the staffing service network to operate so as to assign staff to a project of the enterprise. The staff assignment service is adapted dynamically by repetition of this technique as new scenarios are developed.

11 Claims, 5 Drawing Sheets

U.S. PATENT DOCUMENTS

2010/0138272 A1 6/2010 Rackham

OTHER PUBLICATIONS

Lieslio "Portfolio Decision Analysis for Robust Project Selection and Resource Allocation" (Oct. 2008) Helinski University of Technology, Department of Engineering Physics and Mathematics, Systems Analysis Laboratory Research Reports.*

Pfitzmann et al. "IBM's Unified Governance Framework (UGF) Initiative" (Sep. 5, 2007) (http://domino.watson.ibm.com/library/Cyberdig.nsf/home).*

Tadinen "Human resources management aspects of Enterprise Resource Planning (ERP) Systems Projects" (Apr. 2005) Swedish School of Economics and Business Administration, Accounting Department.*

\* cited by examiner

METHOD AND SYSTEM FOR ASSIGNING STAFF AS A SERVICE IN A SERVICE NETWORK WITHIN A COMPONENT BUSINESS MODEL ARCHITECTURE

BACKGROUND OF THE INVENTION

1. Field of the Invention

The present invention generally relates to techniques for managing the assignment of staff resources, and more particularly to the use of a component business model architecture for organizing the staff assignment function.

2. Background Description

Companies are finding it more difficult to attract, retain and develop their human capital. Ninety percent (90%) of North American business and human resource (HR) executives recently surveyed say their companies are experiencing increased competition for talent. Eighty percent (80%) of companies consider talent management as their top management problem.

There is a potential shortfall of talent from a maturing workforce population, plus many organizations have a lack of understanding of key skills and capabilities that they possess. There are several business applications on the market which have been geared towards addressing the issue of understanding and tracking staff skills with the object of assignment in mind. However, all of these are structured around processes, and therefore deteriorate over time as the supporting processes are adapted in an ad hoc fashion to changing business conditions. Furthermore, the inflexibility and monolithic character of process oriented approaches to staffing are particularly ill-suited to the support of new working practices, increasing employee mobility between companies, and contractual arrangements for working for multiple companies. What is needed is an approach which overcomes the foregoing limitations of process based staffing structures.

SUMMARY OF THE INVENTION

It is therefore an object of the present invention to provide a staffing service methodology that has a stability that is independent of processes that support the methodology.

An aspect of the invention is a method for using a component business model (CBM) architecture to provide a staff assignment service to an enterprise. In a preferred implementation, the method describes a staff assignment scenario in terms of a plurality of process steps, and then describes staffing resources and respective commercialization mechanisms applicable to the staff assignment scenario in terms of business components in a CBM architecture of the enterprise, where the business components applicable to the staff assignment scenario comprise a staffing network. For each business component in the staffing network service, functionalities supporting each of the process steps in the scenario are identified. Collaborative links among the business components are established, sufficient to enable the service functionalities within the staffing network to operate. The staffing network is then used to assign staff to a project of the enterprise.

In one implementation of the invention, the staffing network comprises the following components: a task management component for formulating a staffing request and receiving profiles of candidates responsive to the staffing request; a staffing assignment component for receiving the staffing request, searching for candidates responsive to the staffing request, selecting a candidate, and notifying the selected candidate; a staff administration component for maintaining and updating staffing activity records; and a competencies management component for providing competencies required for the staffing request and providing a profile of qualifications for said searching.

In a further implementation of the invention, the method is applied to additional staff assignment scenarios as these are developed or become available, for example in response to opportunities to outsource one or more components in the staffing network, or in response to availability in the marketplace of personnel able to undertake engagements at the same time with different employers, or otherwise become available for projects of the enterprise without being full time employees of the enterprise.

Another aspect of the invention provides a software solution for servicing the assignment scenario. The software solution is adapted to accommodate distinctions between the business components, supporting for each separate and non-overlapping component the service functionalities provided by the component and being separately adaptable for each component to support changes in the manner of providing the service functionalities. In a variation of this aspect of the invention, computer code for servicing the assignment scenario is comprised of separate modules adapted to accommodate each of the business components in the staffing service network, where each module supports the service functionalities provided by its respective component, and is separately adaptable to support changes in the manner that its respective component provides its service functionalities.

In another aspect of the invention, using a computer implemented interface, a user is presented with a display matrix for correlating the plurality of staffing process steps along a first axis of the matrix and correlating the respective business components along a second axis of the matrix, wherein each of the service functionalities is mapped to a respective cell on the matrix corresponding to the business component providing the service functionality and also corresponding to the process step being supported by the service functionality. Further, the interface enables the user to visualize collaborative interactions between the business components. These collaborative interactions implement a staffing lattice through which the staff assignment services are provided to a project of the enterprise.

A further aspect of the invention provides a staffing service network comprised of business components defined in a CBM architecture of the enterprise, together with a display interface enabling a user to visualize collaborative interactions between the business components, where staff assignment services are provided to the enterprise by operation of a staffing lattice implemented by the collaborative interactions. The visualization provided by the display interface facilitates the addition of functionalities via new components or the enhancement of existing components in the staffing network, and the corresponding development of additional collaborative interactions among the components to accommodate new staffing assignment scenarios.

The method of organizing staffing as an operational service center defined using CBM principles and structures, as described below, is designed to be a repeatable service which executes a cradle to grave set of functions in the area of human capital staffing. That is, the service is organized in such a fashion that its instantiation in support of a project will carry through from the outset of the project to the conclusion of the project. As will be understood from the detailed explanation that follows, and in reliance upon the disclosures of the below referenced component business model (CBM) architecture patent applications, this "cradle to grave" aspect of the invention's methodology flows from the relative stability of the asset-based components into which the business is decomposed. This mode of business decomposition is the premise for operation of the present invention, and it will be observed that the present invention may be implemented in a business as a CBM service network even though large segments of the business have not yet been migrated over to a component business model (CBM). CBM defines operational services centers that can be adopted by a business incrementally.

In its best mode of implementation the method takes into account a proprietary IBM asset, the Professional Marketplace (PMP). The present invention applies the concepts of CBM design to define a staffing service in terms of component structures that are highly repeatable in the marketplace, thus allowing for reuse and interaction with many parts of the enterprise. In the prior art, where the staffing function is provided as an end-to-end process, such reuse is not feasible. However, the method can also be implemented with minimal modification if an asset other than IBM's Professional Marketplace is substituted, provided that such asset—like IBM's Professional Marketplace —can be re-purposed to provide support structures aligned to each CBM component that participates in the staffing function, each such aligned support structure adapting and evolving with its respective CBM component (in contrast to an adaptation and update cycle geared to a complete end-to-end staffing function).

The IBM Professional Marketplace is a dynamic business model designed to optimize the engagement staffing process. This web-based application provides Project Managers with access to real-time information on professionals, allowing them to make more efficient and strategic staffing decisions for projects worldwide. With visibility to current professional profile information such as CVs, functional skill assessments, engagement and availability information, Project Managers have the information they need to assign resources faster, streamline the deployment process and create increased value for clients.

The IBM Professional Marketplace uses sophisticated search and navigation capabilities to pull information from various types of databases including ones that store professional skills and capabilities inventories, assignment and availability information, performance management information, resumes, and employee directories and profile information. This information is housed in the user-friendly IBM Professional Marketplace repository and provides resource requesters with valuable and timely information for immediate staffing decisions. As stated previously, any asset performing similar functions, that can be piecewise aligned to the CBM components participating in a staffing CBM network, can be used as the "core" of the solution provided by the present invention. Given this alignment, if more or fewer features are required, the invention will assure that appropriate changes are incorporated into the assignment solution, efficiently and in a dynamic and fully interactive manner.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
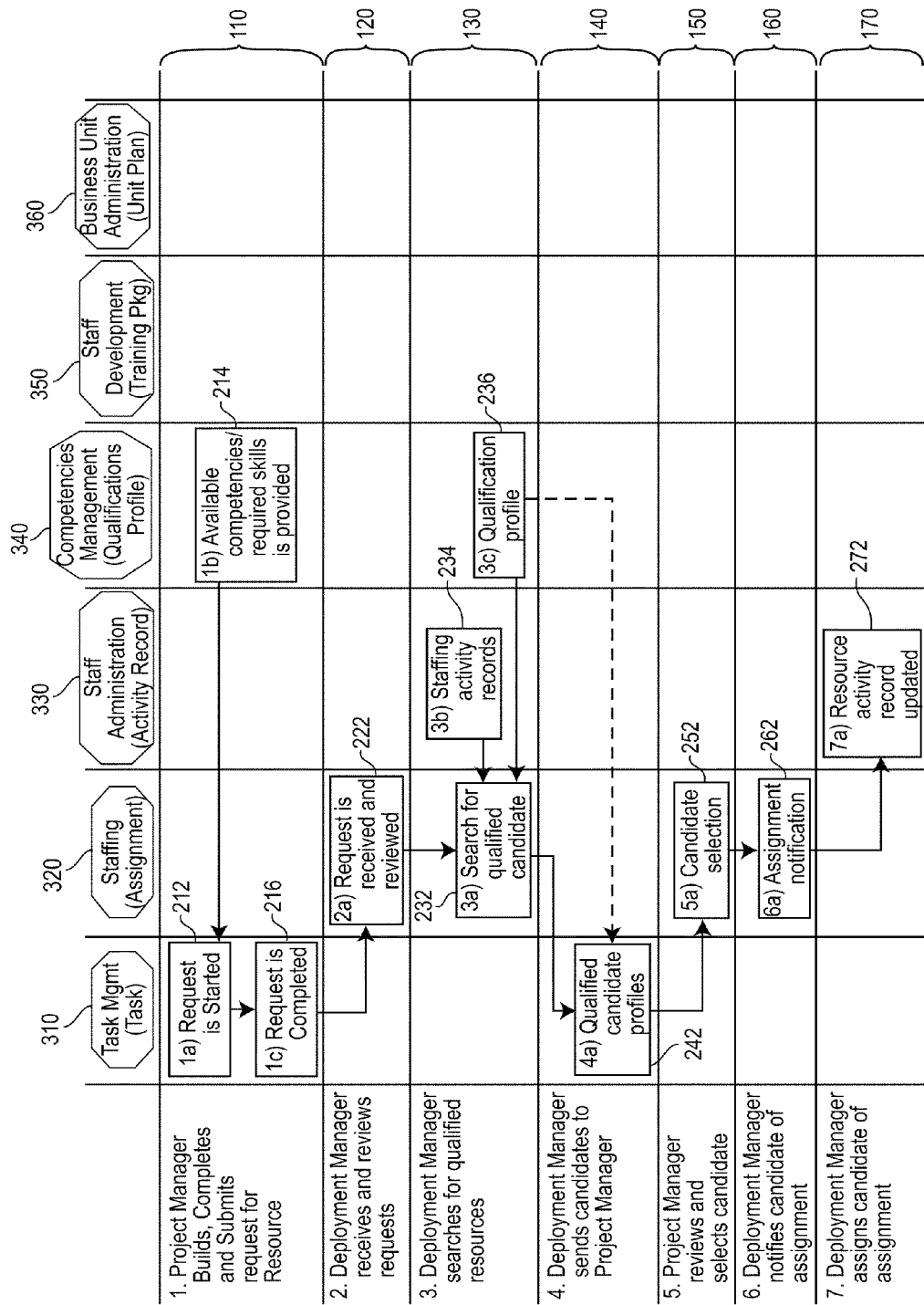
FIG. 2 is a diagram showing how a staffing service is provided using the present invention.
Figure 3:
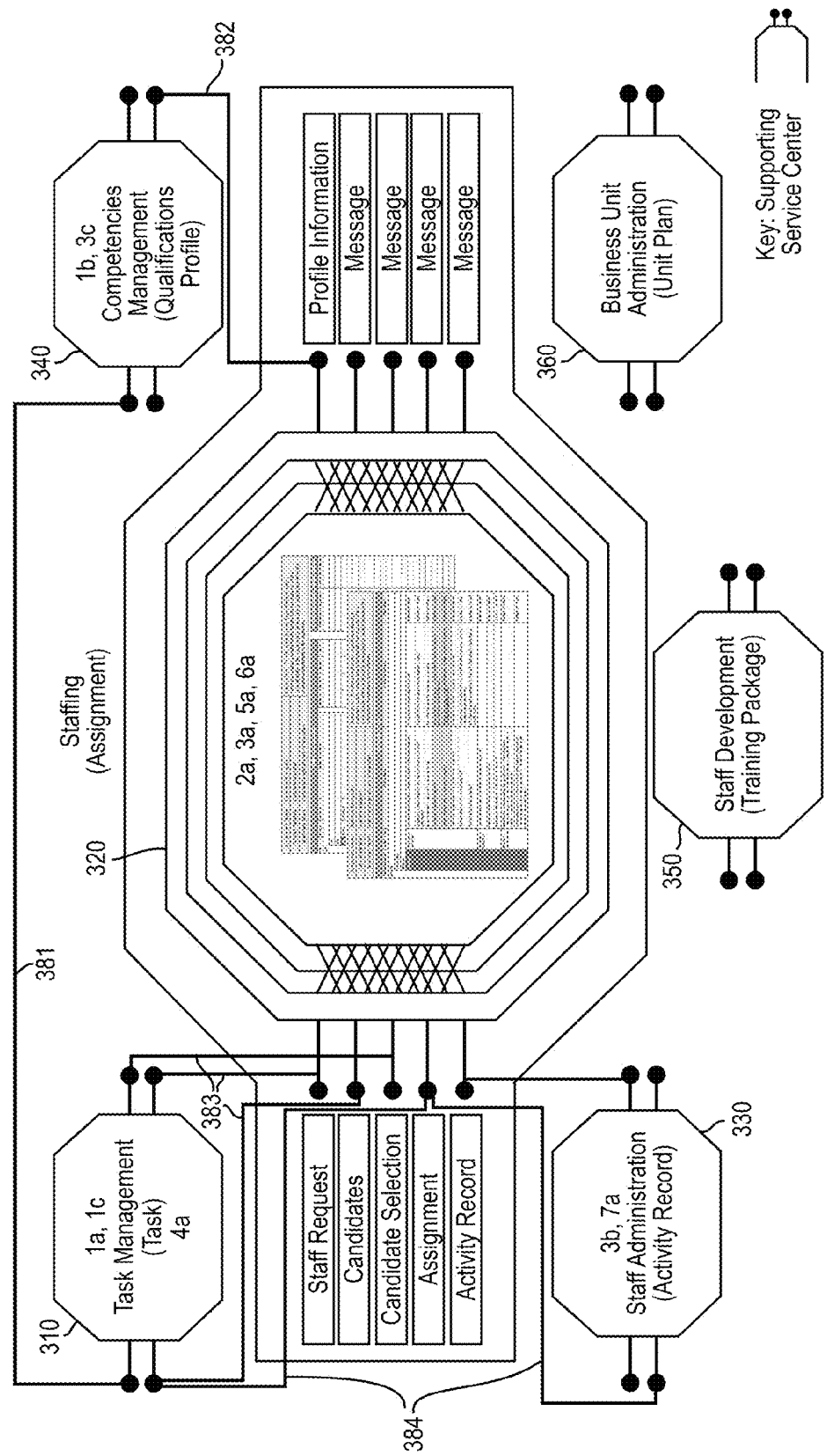
FIG. 3 is a diagram showing how the staffing service of the present invention may be understood using the operational service structures of CBM.

The staffing (assignment) service as described in FIGS. 2 and 3 handles all assignment instances so as to maintain a current perspective of all resources and their status (e.g., available, assigned, on leave, etc.). It aggregates relevant resource information from internal and potentially external sources to facilitate the assignment of resources. The use of the method of the present invention by businesses will give them multiple advantages in the area of sourcing and assigning their staff because of the following features providing the ability to: view assignment request; view resource pool across geographic and business unit boundaries; screen for eligibility based on selected criteria; view employee qualifications profile and activity record; list eligible and available candidates for assignment; filter the candidate list by selected criteria; allow the requesting manager to view and filter the resource pool; prioritize the resource pool by selected criteria; designate a candidate for an assignment; and provide direct and asynchronous access to these "current state" perspectives for individual assignments as well as collections of work assignments.

Figure 1:
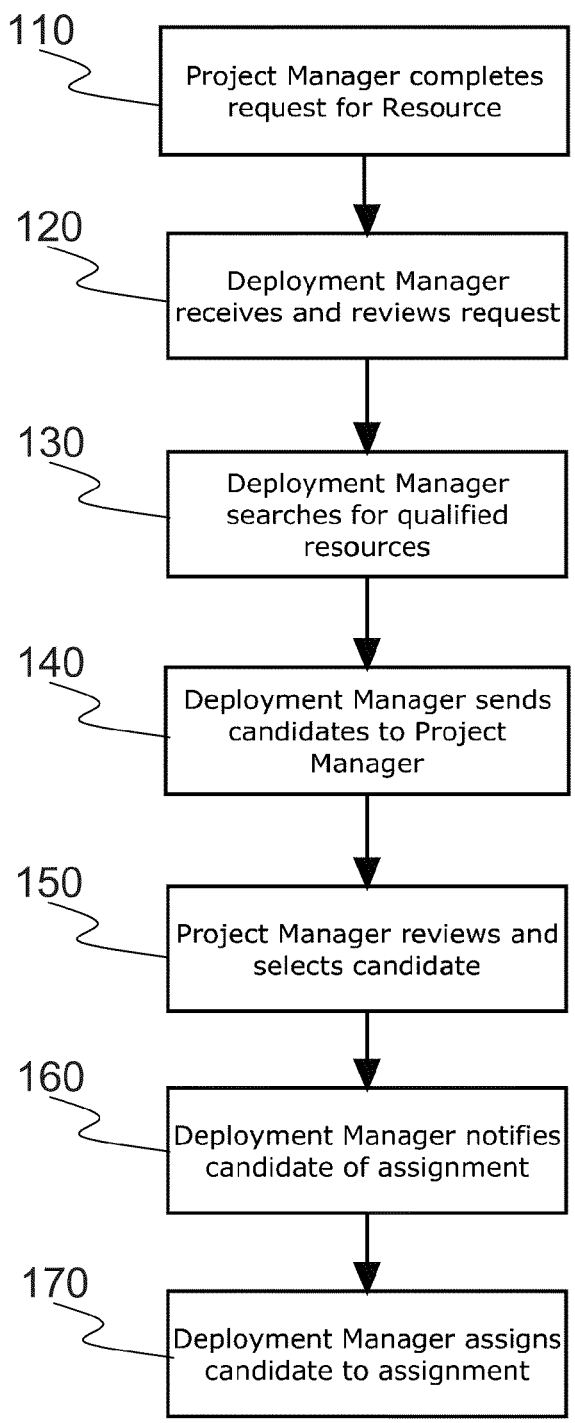
FIG. 1 is a flow chart showing how a staffing service is provided under the prior art.

To better describe how the process of staffing currently works, we have designed the scenario shown in its prior art implementation in FIG. 1. Application of the invention to this scenario is shown in FIG. 2, which has allowed us to identify and design the core aspects of the process and enable these to be encapsulated as an operational service center as shown in FIG. 3.

An overview of how staffing currently functions in an enterprise under the prior art is outlined as shown in FIG. 1. At the front end of the process described in FIG. 1 a project manager builds, completes and submits a request 110 for a resource in support of a task or project. The request is received and reviewed 120 by a deployment manager, who then searches 130 against the criteria provided by the project manager for qualified candidates. When qualified candidates are found, the deployment manager sends them 140 to the project manager, who then reviews the qualified candidates and makes a selection 150. The deployment manager then notifies the selected candidate of the assignment 160 and makes the assignment 170. The process scenario shown in FIG. 1 may be repeated as often as required until completion of the task or project.

It should be stressed that the prior art process shown in FIG. 1 is a single threaded, tightly coupled chain of activities where each assignment works through a "pipeline", in contrast to the approach taken by the present invention which allows for the flexibility of decoupling individual tasks along the chain, as further described below in connection with FIGS. 2 and 3. Thus, as many concurrent but asynchronous assignments are managed, the different tasks can be optimized internally across all traffic and the progress of different assignments move forward in parallel but independently.

Operation of the invention may be contrasted with the prior art process approach by reference to FIG. 2. The process steps of FIG. 1 are set out as rows, which are described in the column at the left side of FIG. 2 and related to the item numbers of FIG. 1 by the row item numbers on the right side of FIG. 2. In a process oriented "end-to-end" solution, the staffing function for a project is driven by the process steps described in FIG. 1 and laid out as row headings in rows 110, 120, 130, 140, 150, 160 and 170 on FIG. 2.

The methodology of the invention parses these process steps across respective CBM components that support the staffing function. The staffing function, as a service network of CBM components, is further described in connection with FIG. 3, but each of these components heads a column on FIG. 2: task management 310, staffing 320, staff administration 330, competencies management 340, staff development 350 and business unit administration 360.

The parsing of process steps, for the scenario shown in FIG. 1, may be described as follows. A Staffing request is initiated 212 (item 1a) and completed 216 (item 1c). These functions are performed by the task management component 310. In order to execute this step 110 in the process, the project manager is provided 214 (item 1b) with available competencies, and the skills required for each, by competencies management component 340. The completed request is received and reviewed 222 (item 2a) by the deployment manager, which is a function of staffing (assignment) component 320. This corresponds to process step 120.

Staffing component 320 also provides the search 232 (item 3a) for qualified candidates, a function that is supported by staffing activity records 234 (item 3b) provided by staff administration component 330 and qualification profiles 236 (item 3c) provided by competencies management component 340. These search functionalities correspond to process step 130. The search results, in the form of profiles 242 (item 4a) of qualified candidates, are received by he project manager from the deployment manager. This transmission task is a function of task management component 310 and corresponds to process step 140.

The project manager selects a candidate 252 (item 5a), based on the qualified candidate profiles 242. This functionality corresponds to process step 150. The deployment manager then provides the selected candidate with notification of the assignment 262 (item 6a), which corresponds to process step 160. Both these functionalities are provided by staffing component 320. Finally, the deployment manager effects assignment of the selected and notified candidate, corresponding to process step 170. This requires that the resource activity record of the candidate be updated 272 (item 7a), which is a functionality of staff administration component 330 corresponding to process step 170.

FIG. 3 shows the concept design, reflecting the alignment of staffing component 320 to other components providing services to the enterprise (e.g. task management 310) in support of the area we are calling the Talent Suite (i.e. components 310-360). What is shown with the aid of FIG. 2 is a mapping of the process scenario shown in FIG. 1 (items 110-170) to business components (items 310-360) that, because of the manner in which they are architected, provide a more persistent repository of the required functionalities. This mapping brings with it an alignment of automated support structures to the business components, in a set of component structures further described below in connection with FIG. 5.

As shown in FIG. 3, the Talent Suite network is centered on staffing component 320, which provides the functionalities required for items 2a (222), 3a (232), 5a (252) and 6a (262). Similarly, task management component 310 provides the functionalities required for items 1a (212), 1c (216) and 4a (242); staff administration component 330 provides the functionalities required for items 3b (234) and 7a (272); and competencies management component 340 provides the functionalities requires for items 1b (214) and 3c (236). The respective functionalities are connected in a staffing lattice by collaborations which are indicated by network connections 381-385, which track the connections shown in FIG. 2.

It should be noted that the service network connections between these components are shown to illustrate the scenario (from FIG. 1) as mapped in FIG. 2. The same Talent Suite network may have different network interconnections for different staffing scenarios. For example, the scenario mapped in FIG. 2 does not show a service role for staff development 350 or business unit administration 360. However, business unit 360 would have a service role in the staffing function enhancement described in FIG. 4B (see item 446). Further, an additional component for evaluating staff (appraisals 444) would be added to the Talent Suite network under this additional scenario.

Figure 4B:
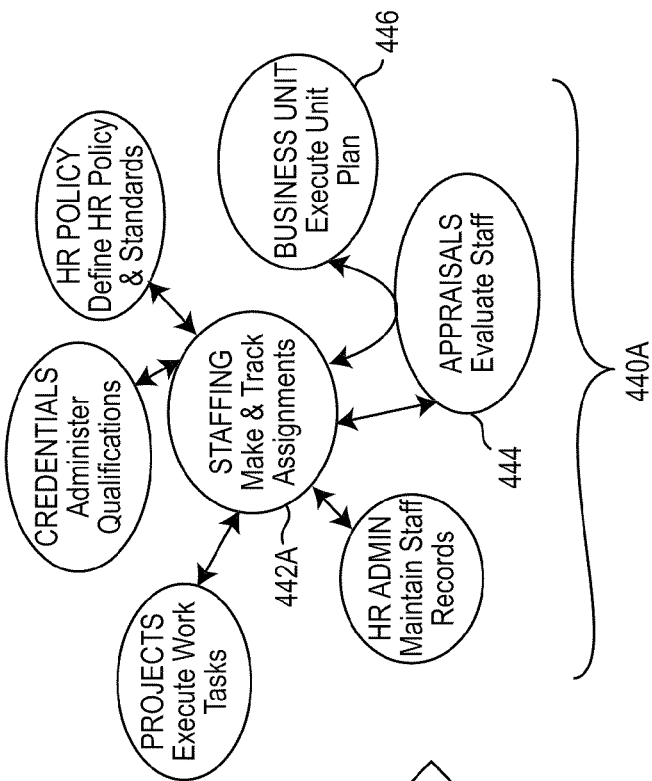
FIGS. 4A and 4B show a business control lattice and its enhancement, respectively.
Figure 4A:
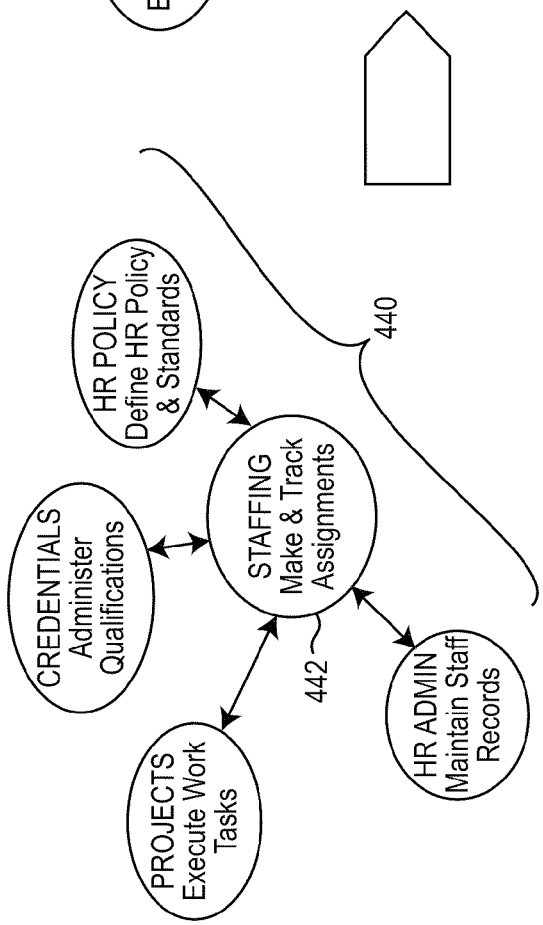

According to the invention, each staffing scenario is mapped to CBM aligned components in the manner illustrated by FIG. 2, with the results illustrated by FIG. 3 and modifiable by scenario adaptations as shown in FIGS. 4A and 4B. The mapping matrix shown in FIG. 2 provides a tool for considering any process scenario (e.g. as shown in FIG. 1), and mapping each process step (e.g. 110-170) to a CBM component (e.g. 310-360). The bases for this mapping are the functionalities defined at an "atomic" level (i.e. one asset type and one commercialization mechanism) by respective CBM components. A given staffing process scenario (e.g. FIG. 1) may have individual steps that map to an individual CBM component (e.g. step 120 to item 222), or that must be parsed among several CBM components (e.g. step 130 to items 232, 234 and 236). It should be noted that the applicability of the invention to an existing software support solution for the staffing function will depend upon whether the solution can be "re-purposed" to accommodate CBM component design distinctions (e.g. between items 232, 234 and 236). It should also be noted that multiple functionalities within a component (e.g. items 212, 216 and 242 within task management component 310 or items 222, 232, 252 and 262 within staffing assignment component 320) are consistent with a single commercialization mechanism.

Figure 5:
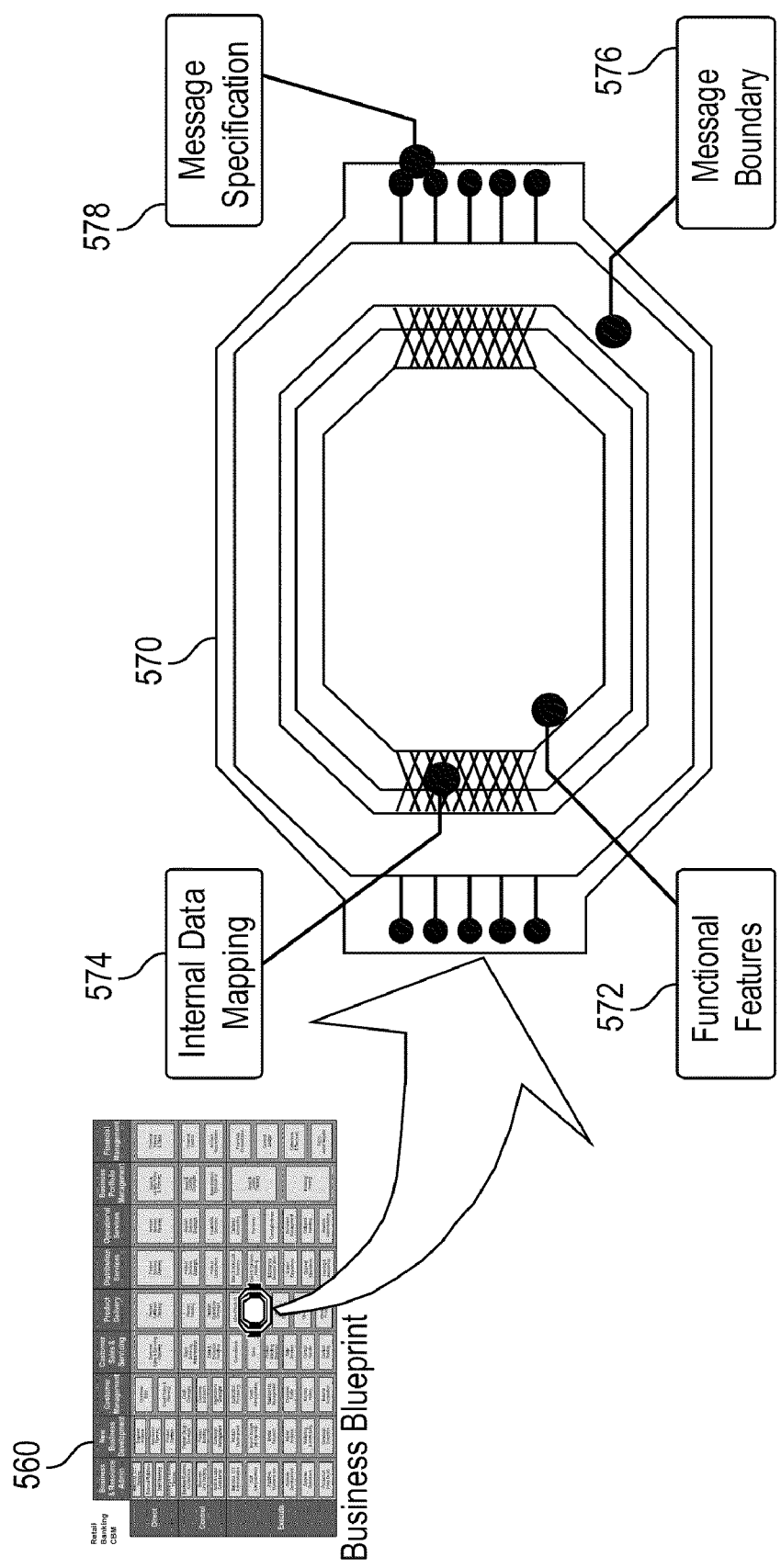
FIG. 5 is a schematic diagram showing the structural elements of a service center component.

Thus the driving structure that enables operation of the invention is the CBM component map (e.g. 560 in FIG. 5). Staffing solutions aligned to these components, and in particular to the distinctions between these non-overlapping components, whether by original design or by re-purposing, can be used to support the invention. The methodology of the invention enables prompt implementation of creatively designed scenarios (e.g. as illustrated in FIG. 4B) by a mapping of functionalities to components, where new functionalities may be added to existing components or invoke components not yet included in the staffing lattice (e.g. Business Unit 446 and Appraisals 444).

Consequently, the above described capability of the invention to adapt to new staffing scenarios as they develop, by means of incremental "rewiring" of the control lattice that defines collaboration among components (—components that are essentially static within the "cradle-to-grave" time scale of any given project that requires staffing services—), provides an adaptive capability not seen in the prior art. Further, it is a significant aspect of this capability that it is component based (i.e. "components" as defined in CBM architecture) rather than enterprise based. That is, individual components within a staffing control lattice need not be part of the same business structure. The collaborative structures—the "wiring" of the control lattice—are functional and operative to make the staffing control lattice work, without regard to whether a particular component within the lattice is outsourced or performed within the enterprise. Indeed, the possibility of efficient outsourcing may enable the development of creative staffing solutions and independent businesses not feasible under "end-to-end" process approaches of the prior art.

As will be evident to those skilled in the art from an examination of the CBM architecture disclosures hereinafter incorporated by reference in support of the present invention, an aspect of the CBM architecture is that components are defined in such a manner—combining an asset type with a commercialization mechanism—that they are substantially reusable within an industry, and even across industries. Thus the underlying CBM architecture is enabling—with regard to the staff assignment function addressed by the present invention—for solutions to the above referenced changes in workforce organization, where potential staff resources for a particular project may be subject to and drawn from a variety of innovative contractual relationships within the marketplace, taking advantage of part-time employment, increased workforce mobility enabled by "virtual office" technology, and the like. The ability of the present invention's staffing control lattice to dramatically improve the responsiveness of the staffing function to marketplace innovations enabled by CBM architecture is an important aspect of the present invention.

Talent Management Staffing Under a Component Business Model Architecture—Staffing Scenario Referenced Interactions The delineation of the core staffing function 320 has been arrived at by employing a design approach described in greater detail in the following co-owned component business model (CBM) architecture patent applications to one of the inventors of the present application: application Ser. No. 11/176,371 (for "SYSTEM AND METHOD FOR ALIGNMENT OF AN ENTERPRISE TO A COMPONENT BUSINESS MODEL" (hereinafter termed "the above referenced foundation patent application"); application Ser. No. 12/325,283 for "SYSTEM AND METHOD FOR ESTABLISHING A COMMERCIAL ECOSYSTEMS BLUEPRINT IN AN ASSET BASED COMPONENT BUSINESS MODEL ARCHITECTURE"; application Ser. No. 12/325,284 for "SYSTEM AND METHOD FOR ASSEMBLY OF BUSINESS SYSTEMS FROM REUSABLE BUSINESS CONTROL ELEMENTS IN AN ASSET BASED COMPONENT BUSINESS MODEL ARCHITECTURE"; application Ser. No. 12/325,285 for "SYSTEM AND METHOD FOR STRUCTURED COLLABORATION USING REUSABLE BUSINESS COMPONENTS AND CONTROL STRUCTURES IN AN ASSET BASED COMPONENT BUSINESS MODEL ARCHITECTURE"; application Ser. No. 12/325,288 for "SYSTEM AND METHOD FOR DETERMINING A THRESHOLD OF DECOMPOSITION FOR ENABLING INCREMENTAL DEVELOPMENT OF PERSISTENT AND REUSABLE BUSINESS COMPONENTS AND CONTROL STRUCTURES IN AN ASSET BASED COMPONENT BUSINESS MODEL ARCHITECTURE", all of whose disclosures are hereby incorporated by reference as foundational for the present invention in content and terminology.

The methodology described in the foregoing patent applications for architecting a business by decomposition into non-overlapping business components, a methodology summarized under the term component business model or CBM, provides the reference frame for the present invention. In particular, the business components described in FIG. 3 are the product of this methodology. Consequent upon the use of this methodology, the components shown in FIG. 3 have the desired attribute of being relatively stable, enabling the functionality provided by these components to service any particular staffing resource need (e.g. a project) from cradle to grave.

This is highly advantageous, because it avoids the disruption to at least some projects which may be ongoing during a period when a prior art "end-to-end process" (e.g. as employed to support the scenario described in FIG. 1) would need to be updated. By employing the above described foundational CBM methodology, adaptation to changing business conditions is simplified: inherently stable business components are able to update their own internal functionalities as needed, without the added burden of a coordination project driven by the updating needs of an overarching "end-to-end process" for handling the staffing function; new approaches to the resource assignment functionalities (provided by the collection of components we have called the Talent Suite) can be assembled with relative ease by revising the collaborations among the supporting components in the service network, with such additional components and functionalities as may be required (as exemplified in connection with FIGS. 4A and 4B).

An element or component in an asset-based design employs an asset type and a control mechanism for doing something useful with that asset type. For example, the asset type "employee" in combination with the "assignment" control mechanism implies a specific capability or use, namely, staff being assigned. Assigning employees to tasks is a capability that has been used in the past and will continue to be needed in the future. Thus the capability is persistent and the logical designs that invoke this capability are relatively stable and, therefore, static.

The business operates by interactions among networks of these components, where each element in the network uses services provided by other elements and, in turn, provides services to other elements and/or customers in the market place, on behalf of the business. By way of example, a service network arranged to show operational connections between staffing components is shown in FIG. 4A. These operational connections among components may be viewed as a control lattice—a depiction of the collection of CBM components that inter-collaborate in the execution of business, thereby defining the content and scope of the enterprise's implementation of CBM structures. The network structure and the flexible collaborative mechanisms employed by components in the network simplify enhancements of the network. Such an enhancement is shown in FIG. 4B. Service network 440 provides the ability to staff projects effectively, using four business control elements (i.e. PROJECTS for the execution of work tasks, CREDENTIALS for the administration of qualifications, HR POLICY for defining HR Policy and standards, HR ADMIN for maintaining staff records) each collaborating with a STAFFING element 442 for making and tracking assignments. To improve the enterprise's ability to re-allocate staff an APPRAISALS business control element 444 and a BUSINESS UNIT element 446 for executing a unit plan are added, with collaborative links to STAFFING element 442A, as shown in FIG. 4B. The resulting service network 440A provides an enhanced staffing service to the enterprise.

This enhanced model leverages the assignment decisioning capability already established with newly enabled insight into business unit workload projections. This provides a view of high potential employees that should be retained and retrained as necessary to adapt to a changing marketplace. With this view of key employees that are to be developed, the model can support an additional behavior of staff re-assignment that in a traditional solution might have been implemented as a completely discrete solution leading to further duplication and fragmentation of the systems and business information.

The flexible enhancement example illustrated in FIGS. 4A and 4B is enabled by components whose collaborative abilities are disciplined in accordance with the structure shown in FIG. 5. Components are defined in a non-overlapping and comprehensive manner as described above and in the foundation CBM architecture patent application for the asset based component business model, and arranged on a CBM map 560. Each component added to a service network follows the structural discipline shown in FIG. 5. Component 570 is characterized by functional features 572. Internal data mapping 574 and message specification 578 needed to support the commercialization mechanisms and control structures of the component 570 are connected through message boundary 576. Internal data mapping 574 is a "standards" based mapping of information using meta data to link to legacy data structures. Message specification 578 provides definition of the business services provided by the component, along with an hierarchical decomposition to the underlying services provided through the technology layer supporting the enterprise. A structured breakdown of prevailing practices functionality (for legacy system alignment) is described by functional features 572. Message boundary 576 provides a buffer that effectively wraps a service envelope around component 570, including interim capabilities designed to mask limitations reflecting staged development of the component 570. The design encapsulates specific business expertise within the component, leading to service specifications that are optimized and re-usable.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer-implemented method for using a component business model (CBM) architecture to provide a staff assignment service to an enterprise, comprising:
   describing, using a computer, a staff assignment scenario in terms of a plurality of process steps;
   describing, using said computer, resources available to the enterprise and respective commercialization mechanisms applicable to said staff assignment scenario in terms of business components in a CBM architecture of the enterprise, said business components comprising a staffing network;
   identifying, using said computer, for each business component of the CBM architecture in the staffing network service functionalities supporting each of said plurality of process steps;
   establishing, using said computer, collaborative links among said business components sufficient to enable said service functionalities within the staffing network;
   using the staffing network to assign staff to a project of the enterprise, by presenting to a user a display matrix for correlating said plurality of process steps along a first axis of said display matrix and correlating said respective business components of the CBM architecture along a second axis of said display matrix, wherein each of said service functionalities is mapped to a respective cell on said matrix corresponding to the business component providing the service functionality and the process step being supported by the service functionality, and
   enabling the user to visualize collaborative interactions between said business components of the CBM architecture, said collaborative interactions implementing a staffing lattice which defines collaboration among components of the enterprise and through which said staff assignment services are provided to said project of the enterprise,
   wherein said CBM architecture provides a persistent repository of said staffing network service functionalities: and
   providing a software solution for servicing said staff assignment scenario, wherein said software solution is adapted to accommodate distinctions between said business components of the CBM architecture, supporting for each separate and non-overlapping component the service functionalities provided by the component and being separately adaptable for each component to support changes in the manner of providing said service functionalities.

2. The method of claim 1, wherein the business components of the CBM architecture which comprise the staffing network include the following components:
   a task management component for formulating a staffing request and receiving profiles of candidates responsive to the staffing request;
   a staffing assignment component for receiving the staffing request, searching for candidates responsive to the staffing request, selecting a candidate, and notifying the selected candidate;
   a staff administration component for maintaining and updating staffing activity records; and
   a competencies management component for providing competencies required for the staffing request and providing a profile of qualifications for said searching.

3. The method of claim 1, further comprising establishing additional collaborative links responsive to a second staff assignment scenario.

4. The method of claim 1, wherein at least one component in said staffing network is outsourced.

5. The method of claim 1, wherein the resources available to the enterprise includes personnel not employed full time by the enterprise.

6. A system for using a component business model (CBM) architecture to provide a staff assignment service to an enterprise, comprising:
   means for describing a staff assignment scenario in terms of a plurality of process steps;
   means for describing staffing resources and respective commercialization mechanisms applicable to said staff assignment scenario in terms of business components in a CBM architecture of the enterprise, said business components comprising a staffing network;
   means for identifying for each business component of the CBM architecture in the staffing network service functionalities supporting each of said plurality of process steps;
   means for establishing collaborative links among said business components sufficient to enable said service functionalities within the staffing network;
   means for using the staffing network to assign staff to a project of the enterprise, said means for using including
   means for presenting to a user a display matrix for correlating said plurality of process steps along a first axis of said display matrix and correlating said respective business components of the CBM architecture along a second axis of said display matrix, wherein each of said service functionalities is mapped to a respective cell on said matrix corresponding to the business component providing the service functionality and the process step being supported by the service functionality, and means for enabling the user to visualize collaborative interactions between said business components of the CBM architecture, said collaborative interactions implementing a staffing lattice which defines collaboration among components of the enterprise and through which said staff assignment services are provided to said project of the enterprise; and means for servicing said staff assignment scenario, wherein said servicing is adapted to accommodate distinctions between said business components, supporting for each separate and non-overlapping component the service functionalities provided by the component and being separately adaptable for each component to support changes in the manner of providing said service functionalities.

7. The system of claim 6, wherein the business components of the CBM architecture which comprise the staffing network include the following components:

a task management component for formulating a staffing request and receiving profiles of candidates responsive to the staffing request;

a staffing assignment component for receiving the staffing request, searching for candidates responsive to the staffing request, selecting a candidate, and notifying the selected candidate;

a staff administration component for maintaining and updating staffing activity records; and a competencies management component for providing competencies required for the staffing request and providing a profile of qualifications for said searching.

8. The system of claim 6, further comprising means for establishing additional collaborative links responsive to a second staff assignment scenario.

9. The system of claim 8, further comprising means for adding a component to the service network in order to provide an additional functionality required or suggested by said second staff assignment scenario.

10. The system of claim 9, wherein the additional functionality is an improved ability to re-allocate staff and the additional component is an appraisals component for evaluating staff.

11. A computer implemented system for using a component business model (CBM) architecture to provide a staff assignment service to an enterprise, comprising:

first computer code, executed by a computer, for describing a staff assignment scenario in terms of a plurality of process steps;

second computer code, executed by said computer, for describing staffing resources and respective commercialization mechanisms applicable to said staff assignment scenario in terms of business components in a CBM architecture of the enterprise, said business components comprising a staffing network;

third computer code, executed by said computer, for identifying for each business component of the CBM architecture in the staffing network service functionalities supporting each of said plurality of process steps;

fourth computer code, executed by said computer, for establishing collaborative links among said business components sufficient to enable said service functionalities within the staffing network;

fifth computer code, executed by said computer, for using the staffing network to assign staff to a project of the enterprise, by presenting to a user a display matrix for correlating said plurality of process steps along a first axis of said display matrix and correlating said respective business components of the CBM architecture along a second axis of said display matrix, wherein each of said service functionalities is mapped to a respective cell on said matrix corresponding to the business component providing the service functionality and the process step being supported by the service functionality, and enabling the user to visualize collaborative interactions between said business components of the CBM architecture, said collaborative interactions implementing a staffing lattice which defines collaboration among components of the enterprise and through which said staff assignment services are provided to said project of the enterprise: and sixth computer code, executed by said computer, for servicing said staff assignment scenario, wherein said sixth computer code is further comprised of separate modules adapted to accommodate each of said business components, each module supporting the service functionalities provided by a respective component and being separately adaptable to support changes in the manner that the respective component supports said service functionalities.

* * * * *